United States Patent [19]
Gupta

[11] Patent Number: 5,699,726
[45] Date of Patent: Dec. 23, 1997

[54] CONTINUOUS SOAKING SYSTEM

[76] Inventor: Rajendra P. Gupta, 9 Veery Lane, Ottawa, Ontario, Canada, K1J 8X4

[21] Appl. No.: 664,562

[22] Filed: Jun. 17, 1996

[51] Int. Cl.⁶ .................................. A23B 4/08; B02B 3/12
[52] U.S. Cl. ........................ 99/516; 99/534; 366/114; 134/89; 134/91; 134/184
[58] Field of Search ............................ 99/516, 518, 520, 99/534, 536, 471, 276, 277; 366/14, 15, 26, 108, 114, 115; 134/89, 91, 184

[56] References Cited

U.S. PATENT DOCUMENTS

| | | | |
|---|---|---|---|
| 2,582,371 | 1/1952 | Ball et al. | 99/534 X |
| 2,587,939 | 3/1952 | Webb | 99/534 X |
| 4,254,699 | 3/1981 | Skinner et al. | 99/516 |
| 4,381,703 | 5/1983 | Crimmins et al. | 99/516 |
| 5,381,731 | 1/1995 | Thom, Jr. | 99/516 |

*Primary Examiner*—Reginald L. Alexander

[57] ABSTRACT

The invention relates to a soaking system for solids. The system includes stacked tanks each of which has a conical bottom. The tanks are connected through perforated valves through which the solids move from the top and water is fed from the bottom. The solids are soaked in a counterflowing water. In one embodiment, two or more similar units are stacked one upon the other for more efficient operation.

14 Claims, 1 Drawing Sheet

CONTINUOUS SOAKING SYSTEM

FIELD OF THE INVENTION

The invention generally relates to a soaking system for soaking solids in liquid. In particular, it is directed to a continuous soaking system for soaking solids such as grains, soybeans etc. in liquid such as water.

BACKGROUND OF INVENTION

Many solids need to be soaked in a liquid for a predetermined time and thoroughly cleaned and rinsed with the liquid prior to being further processed. Significant over-soaking or under-soaking is undesirable due either to the economics of soaking or due to the effect of soaking duration on the processed product down stream. As an example, certain processes require soybeans to be soaked in water for about 8 hours and thoroughly rinsed prior to grinding them in water to make slurry and extract soymilk. The problem is to supply the soaked and cleaned solids continuously at a minimum cost in terms of capital investment and liquid use.

The soaking systems currently available soak solids in individual tanks for a predetermined time and the contents of each tank are treated independently for cleaning, rinsing, etc. prior to being sent for further processing. This requires an arrangement to feed solids and liquid to, and remove the solids and liquid from, each individual tank. In addition the liquid required for cleaning becomes substantial. An additional problem is that either the soaking tanks have to be higher than the feed hopper used for further processing the solids or a mechanical conveyor is required to carry solids to the feed hopper.

U.S. Pat. No. 4,254,699 Mar. 10, 1981 Skinner et al and U.S. Pat. No. 4,381,703 May 3, 1983 Crimmins et al both relate a liquid-solid contacting apparatus in which solid and liquid are fed at the top of a chamber and soaked solids are discharged at the bottom. There are no cleaning and rinsing operations.

U.S. Pat. No. 5,381,731 Jan. 17, 1995 Thom, Jr. describes a vertical steam conditioning column for feed grains in which the grains are fed from the top of the column whereas steam is fed from the bottom. The grains are therefore treated in a counterflowing steam environment. The column is made of sections and can be easily expanded or reduced in sizes. The steam conditioning is an important part of processing for feed grains in preparation for flaking, or pelleting, or other forming operations. The conditioning however is not soaking or rinsing

OBJECTS OF INVENTION

It is therefore an object of the invention to provide a soaking system and method for solids which is continuous in operation.

It is another object of the invention to provide a counter-flow soaking system and method for solids which are efficient in resource usage and easy to operate.

SUMMARY OF INVENTION

Briefly stated, in accordance with one aspect, the invention relates to a counterflow soaking system for soaking solids in a liquid in a substantially continuous manner. The system comprises more than one similar containers which are stacked one upon the other for holding the solids therein and a perforated valve provided between two adjacent containers and connecting the outlet of an upper container with the inlet of the container immediately below it. Each container further comprises an inlet at or near the top portion thereof for feeding the solid therein, an outlet at the bottom portion thereof for extracting the soaked solids therefrom, a liquid inlet at or near the bottom portion thereof for feeding the liquid into the container under pressure, and a liquid outlet at or near the top portion thereof for removing the liquid therefrom.

In accordance with another aspect, the invention is directed to a method of soaking solids in a liquid in a substantially continuous manner, using more than one similar container stacked one upon the other. The method comprises steps of feeding solids to be soaked into the top container from an inlet located at the top portion thereof, feeding liquid under pressure into the bottom container from the liquid inlet located at the bottom portion thereof and passing the liquid from the bottom container to the container immediately above it and so on towards the top container. The method further includes steps of removing the liquid from a liquid outlet located at the top portion of the top container so that the liquid flows upwardly from the bottom container to the top container, allowing the solids to fall from a container to the container immediately below it, and extracting soaked solids from the bottom container from an outlet located at the bottom portion thereof.

BRIEF DESCRIPTION OF DRAWINGS

A sole figure is a schematic illustration of a counterflow continuous soaking system according to preferred embodiments of the invention.

DETAILED DESCRIPTION OF PREFERRED EMBODIMENTS OF INVENTION

Figure 1:
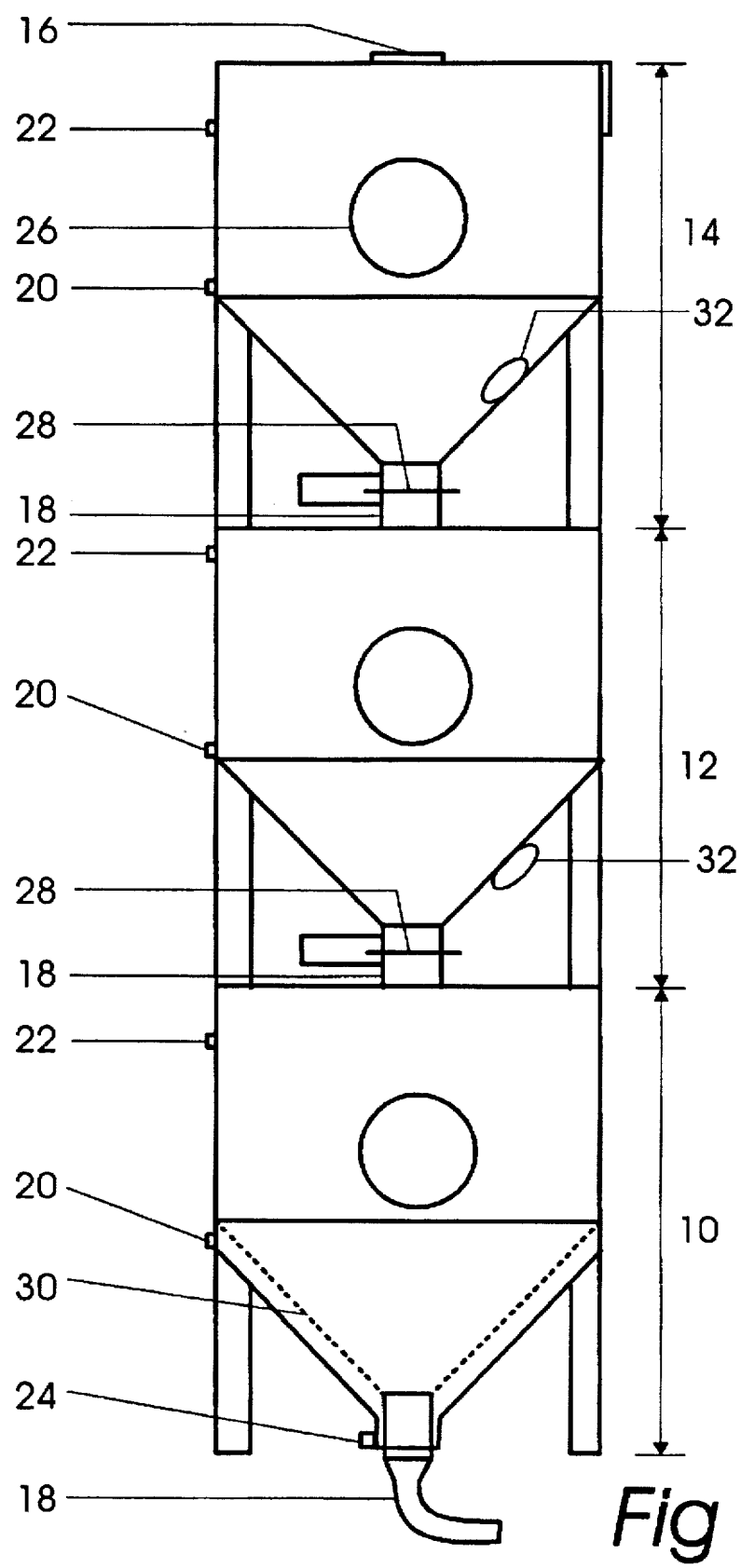

The prior an problem has been solved cost effectively by arranging and connecting the tanks in such a way that the solids and liquid essentially move in opposite directions. Referring to the attached drawing which illustrates schematically a continuous counterflow soaking system according to one embodiment of the invention. In the figure, there are three similar tanks 10, 12 and 14 stacked one upon the other. Each tank has an inlet 16 at the top and an outlet 18 at the bottom which is conical in shape. Each tank also has a water inlet 20 near the bottom, an overflow port 22 near the top as well as a drain 24. A manhole viewport 26 is also provided through which the interior of the tank can be observed. The stacked tanks are connected by mating the outlet of an upper tank and the inlet of a tank below. There is provided a perforated valve 28 between the tanks. In this embodiment only the water inlet of the bottom tank and the overflow port of the top tank are in use and all the remaining water ports including drains are closed. Therefore, water moves upwards from the bottom to the overflow port of the top tank. However water can be fed and removed separately from individual port of each tank. In operation, solids to be soaked are fed through the inlet 16 and water moves upwardly under hydraulic forces exerted by a liquid pump (not shown) from the water inlet 20 of the bottom tank. Solids are held back by a perforated valve which passes liquid easily therethrough. Solids flooded with liquid are held in each tank for a predetermined period of time which is adjustable for the desired degree of soaking. After the period, the perforated valve is opened and the solids move between consecutive tanks under gravity while water continuously moves upwardly in the direction opposite of the solids, until properly soaked solids are extracted from the outlet of the bottom tank. The counterflow allows the same liquid to go through successive tanks and become more and more saturated with the elements removed from the solids while the soaked and rinsed solids become available for further processing. In another embodiment, a screen 30 (shown in dotted lines) can be provided near the conical bottom of each tank to let any dirt settle at the bottom of the tank. The drain of the bottom tank is opened to remove the settled dirt mixed with water from time to time.

An additional advantage of this method of soaking and cleaning solids is that the hydrostatic head, available due to the vertical flooded arrangement of the tank, allows the solid-liquid slurry from the bottom tank of the system to be moved under gravity to the process feed hopper or to the next stacks of tanks, provided they are lower at the inlet point than the liquid head in the preceding stack.

In yet another embodiment of the invention, the tanks are fitted with a vibrator 32 which can be located in any one of the tanks or on their wall, either outside or inside thereof, to assist in the movement of solids, especially the solids contacting the tank walls.

I claim:

1. A counterflow soaking system for soaking solids in a liquid in a substantially continuous manner comprising:

more than one similar containers stacked one upon the other for holding the solids therein;

each container comprising;

an inlet at the top portion thereof for feeding the solid therein;

an outlet at the bottom portion thereof for extracting the soaked solids therefrom;

a liquid inlet at the bottom portion thereof for feeding the liquid into the container under pressure; and a liquid outlet at the top portion thereof for removing the liquid therefrom;

and a perforated valve provided between two adjacent containers and connecting the outlet of an upper container with the inlet of the container immediately below it.

2. The counterflow soaking system according to claim 1 wherein a vibrator is provided in one or more containers to assist the flow of solids.

3. The counterflow soaking system according to claim 2 wherein each container comprises a conical bottom and the outlet provided at the lowest part of the conical bottom.

4. The counterflow soaking system according to claim 3 wherein a perforated valve is provided at the outlet.

5. The counterflow soaking system according to claim 4 wherein a manhole viewing port is provided on each container.

6. A method of soaking solids in a liquid in a substantially continuous manner, using more than one similar container stacked one upon the other, comprising steps of;

feeding solids to be soaked into the top container from an inlet located at the top portion thereof;

feeding liquid under pressure into the bottom container from the liquid inlet located at the bottom portion thereof;

passing the liquid from the bottom container to the container immediately above it and so on towards the top container;

removing the liquid from a liquid outlet located at the top portion of the top container so that the liquid flows upwardly from the bottom container to the top container;

allowing the solids to fall from a container to the container immediately below it, and extracting soaked solids from the bottom container from an outlet located at the bottom portion thereof.

7. The method according to claim 6 wherein the step of feeding and removing the liquid comprises steps of feeding liquid from a liquid inlet at the bottom portion of each container and removing the liquid from a liquid outlet at the top portion of each container separately.

8. The method according to claim 7 comprising a further step of generating vibration in one or more containers to assist the flow of solids.

9. The method according to claim 6 further comprising a step of adjusting the period of soaking.

10. The method according to claim 7 further comprising a step of adjusting the period of soaking.

11. The method according to claim 8 further comprising a step of adjusting the period of soaking.

12. The method according to claim 9 further comprising a step of allowing the solids to fall, from time to time, from a container to the container immediately below it.

13. The method according to claim 10 further comprising a step of allowing the solids to fall, from time to time, from a container to the container immediately below it.

14. The method according to claim 11 further comprising a step of allowing the solids to fall, from time to time, from a container to the container immediately below it.

* * * * *